July 24, 1956
H. KELEM
2,755,877
SPEED CONTROL MECHANISM FOR MOTOR VEHICLES
Filed March 29, 1954
2 Sheets-Sheet 1
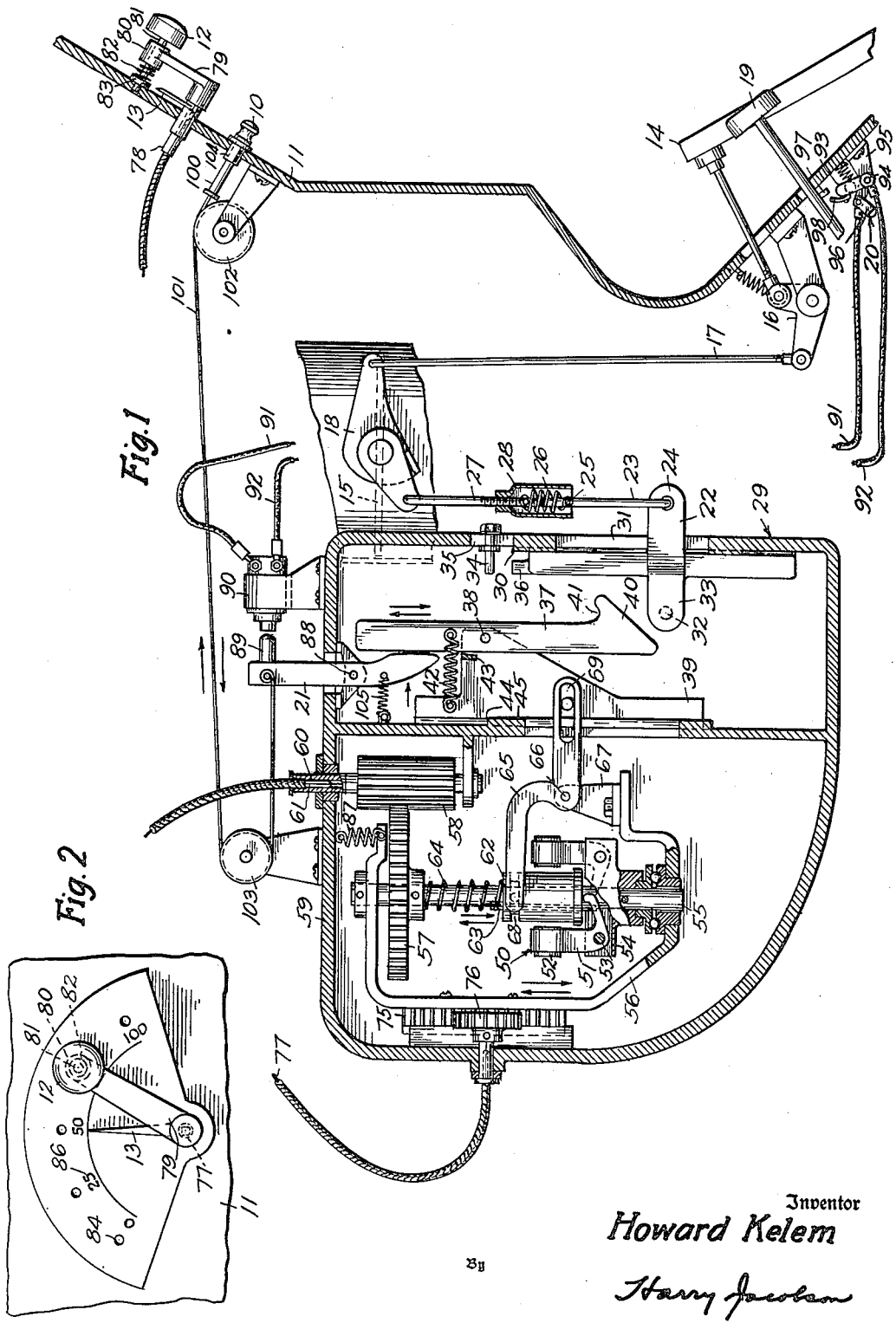
Inventor
Howard Kelem
By
Harry Jacobson
Attorney July 24, 1956  H. KELEM  2,755,877
SPEED CONTROL MECHANISM FOR MOTOR VEHICLES
Filed March 29, 1954  2 Sheets-Sheet 2
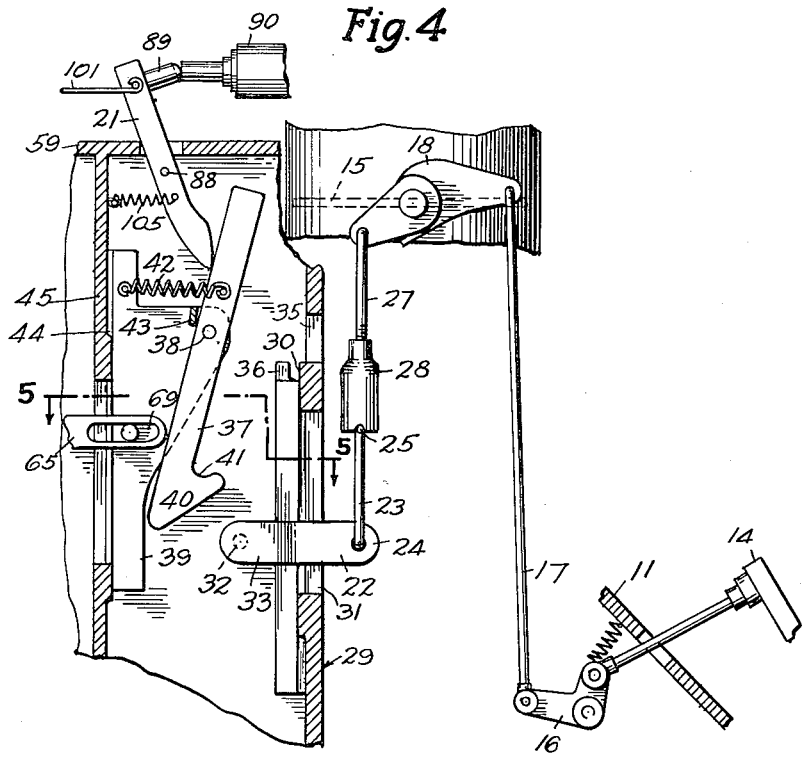
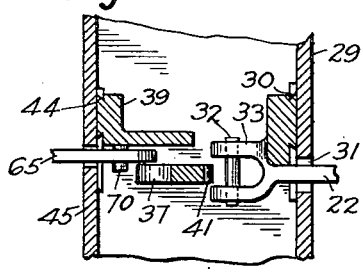
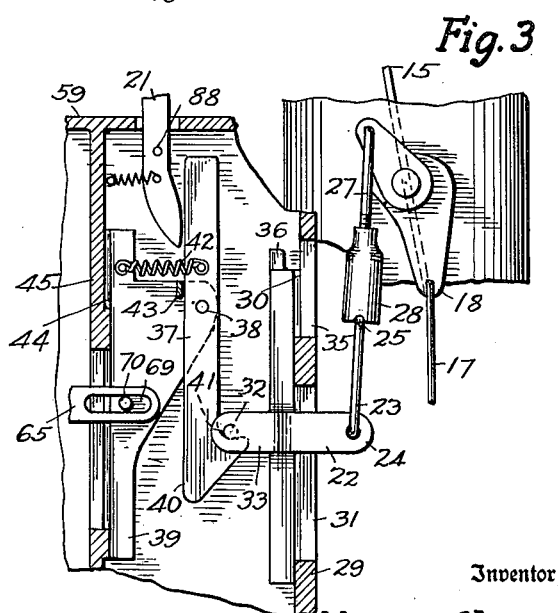
Inventor
Howard Kelem
Harry Jacobson
Attorney

United States Patent Office 2,755,877
Patented July 24, 1956

2,755,877

SPEED CONTROL MECHANISM FOR MOTOR VEHICLES

Howard Kelem, Far Rockaway, N. Y.

Application March 29, 1954, Serial No. 419,183

19 Claims. (Cl. 180—82.1)

This invention relates to motor vehicle speed control mechanisms and particularly to devices designed, when set, to maintain any selected vehicle speed automatically, while permitting normal driver operation of the vehicle at any other speed.

The invention contemplates the provision of a movable throttle member connected to the throttle valve and to the accelerator of a motor vehicle and of control means responsive to the speed of the vehicle for moving the member to open and to close the throttle valve automatically as the vehicle speed varies thereby to maintain the vehicle speed substantially constant under varying driving conditions.

The invention further contemplates the provision of a readily disengageable connection between the throttle member and the automatic control means for operating the member, whereby the member is freed of said means on depression of the accelerator to permit emergency operation of the vehicle at speeds higher than the selected speed, without removing the control means from the position in which it is set to determine the selected speed, so that release of the accelerator by the driver automatically restores operation of the automatic control.

The invention further contemplates the provision of a brake-pedal-operated switch and control releasing means whereby the automatic control means is rendered inoperative on operation of the brake pedal and thereafter the vehicle is operated up to and somewhat past the selected speed as though the automatic control means were not present, but after the selected vehicle speed is attained, the control means again becomes operative without the need for any further action on the part of the driver.

The invention further contemplates the provision of means manually operated and mounted on the dashboard, for rendering and maintaining the control means inoperative, as in case of the mechanical failure thereof.

The invention further contemplates the provision of means accessible to the driver as at the dashboard, for adjusting the position of the control means bodily and as a unit with relation to the throttle member, whereby the desired constant speed may be quickly and easily selected and changed as may be desired.

The various objects of the invention will be clear from the description which follows and from the drawings, in which Fig. 1 is an elevational view, partly in section, of the speed control mechanism and of the associated parts of a motor vehicle, the throttle member or slide being shown disconnected from the automatic control means and in the position assumed thereby just after the brake has been applied and then released and before the accelerator is again depressed.

Fig. 2 is an elevational view of part of the dashboard and of the constant speed selecting indicator.

Fig. 3 is a fragmentary elevational view, similar to Fig. 1, of the speed control mechanism, the parts being shown in the operative positions assumed thereby when a relatively high constant speed is selected and the throttle valve is nearly wide open.

Fig. 4 is a similar view thereof, the trigger and throttle slide being shown in manually-released, or brake-switch-released positions thereof, wherein normal operation of the accelerator at any speed is permitted and the automatic control means is inoperative.

Fig. 5 is a fragmentary horizontal sectional view taken on the line 5—5 of Fig. 4.

In the practical embodiment of the invention shown by way of example, the manually manipulated emergency release knob 10 is mounted on the dashboard 11, as is the knob 12 for the speed selector needle 13. The accelerator pedal 14 is connected in the usual manner to the throttle valve 15 as by means of the lever 16, rod 17 and throttle lever 18. The usual brake pedal 19 closes the normally open switch 20, of any suitable type, on the downward movement of the pedal and again opens the switch on its return movement to cause releasing movement of the trigger 21 in a manner later to be described.

As has been indicated, suitable control means is provided which is responsive to the speed of the vehicle and has a separable connection with the throttle slide 22, said slide being connected to the throttle lever 18. Movement of the slide by the control means therefore increases or decreases the opening of the throttle valve 15 and incidentally moves the accelerator 14, and vice versa, movement of the accelerator operates the throttle slide and the throttle valve. To permit adjustment of the relative positions of the valve 15 and slide 22, an adjustable and yieldable connection is provided therebetween. Said connection comprises the rod 23 having the lower end part thereof passed through the extension 24 of the throttle slide. A pin 25 passing through the upper end part of the rod is secured to the lower end of the tension spring 26. The upper end of said spring is connected to a pin passing through the lower portion of the rod 27, the upper end of which is secured to the throttle lever 18. A sleeve 28 surrounds the spring 26. The sleeve is screwed on the rod 27 and normally rests on the pin 25 under the urge of the spring 26. Rotation of the sleeve in one direction raises the sleeve on the rod 27 and permits the spring to pull the rods toward each other, thereby to shorten the combined effective lengths of the rods 27 and 23 and to raise the slide 22. Rotation of the sleeve in the opposite direction lowers the sleeve on the rod 27 and separates that rod further from the rod 23 to increase the combined effective lengths of the rods and to lower the slide 22.

Said slide 22 is mounted for vertical movement relatively to the fixed casing 29 for the control mechanism, the casing being suitably secured in place in the motor vehicle preferably near the throttle valve or dashboard. To guide the slide, an upright dovetail tongue and groove joint 30 is provided along the casing wall and the length fo the slide. One projection 24 of the slide passes through the slot 31 in the casing wall, while an oppositely extending projection is bifurcated and carries the transverse pin 32 between the branches 33 thereof. To limit the upward movement of the slide and consequently to set the maximum permissible throttle opening and the maximum speed, an adjustable stop 34 is arranged in the slot 35 of the casing and is engaged by the projection 36 on the top of the slide when the slide is raised by depression of the accelerator.

The means for controlling and changing the position of the slide 22 during operation of the vehicle and corresponding to changes in vehicle speed, will now be described. In the form shown, a suitable vehicle speed responsive device, such as a centrifugal governor, is utilized to move the locking lever 37 for the slide and thereby to move the throttle slide when said slide is engaged by the lever. The lever is pivoted as at 38 to the control slide 39, and at its lower end is provided with a hook 40 adapted to swing in between the branches 33 of the throttle slide 22 and to receive the pin 32 in the depression 41 of the hook. A spring 42 between the lever 37 and the control slide serves to maintain the lever normally upright in position to receive the pin 32 and against the stop 43 on the slide 39. To guide said slide in the vertical movement thereof, a dovetail or the like tongue and groove joint 44 is provided between the slide and the partition wall 45 of the casing 29.

The speed responsive unit including the slide 39 is adjustable manually and vertically as a whole within the casing 29 in a manner soon to be described, on the operation of the dashboard knob 12 to select the desired speed and thereby to set the vertical position of the hook 40. Said unit comprises the centrifugal governor 50 of any well known type, having levers such as 51 carrying the weights 52 and pivoted as at 53 to the channel 54 secured to the upright shaft 55. Said shaft is rotatably mounted in the C-shaped frame 56 and carries the gear wheel 57 near the upper end thereof. Meshing with said wheel 57 is the elongated pinion 58 mounted for rotation in the casing wall 59 and having an extension provided with a hole 60 square in cross section to receive the similar square end of the flexible speedometer shaft 61, whereby the pinion, gear wheel, shaft 55 and governor are rotated in accordance with the speed of the vehicle in which the mechanism is mounted.

The sleeve 62 is keyed to the shaft 55 for rotation therewith and for longitudinal movement relatively thereto as by means of the key 63. The lower end of the sleeve 62 is engaged by the inner ends of the governor levers 51 under the urge of the spring 64 around the shaft. The centrifugal force on the governor levers varies as the speed of the shaft 55 varies, and swings the levers to cause the sleeve to move up on said shaft on increase of the speed of rotation, or down on decrease of the speed of rotation and consequent release of the sleeve by the levers. Motion of the sleeve 55 is transmitted to the slide 39 by the control lever 65, which is pivoted as at 66 to a bracket 67 on the frame 56. One end of the lever 65 is bifurcated, each branch carrying a stud which enters the circumferential groove 68 in the sleeve. The other end of said lever 65 is slotted as at 69 and receives the pin 70 projecting from the control slide 39. Hence vertical movement of the sleeve 55 results in vertical movement in the opposite direction of the control slide 39 and lock lever 37.

Since the position of the hook recess 41 in the lock lever 37 determines the position of the pin 32 and of the size of the throttle valve opening, means are provided to set the lock lever at the proper point to feed the required amount of fuel for the selected vehicle speed. Said means comprises the rack 75 secured to the movable frame 55 and meshing with the pinion 76 rotatably supported by and inside of the wall of the casing 29. A flexible shaft 77, similar to the speedometer shaft, is similarly connected to the shaft of the pinion 76 and extends to the dashboard so that rotation of the shaft 77 rotates the pinion and bodily moves the rack together with the entire control unit including the slide 39 and lock lever 37. The flexible shaft 77 is connected to the shaft 78 rotatably mounted in the dashboard and carrying the hub of the handle 79. The outer end 80 of the handle carries the stud shaft 81 projecting from the knob 12, there being a compression spring 82 around the stud shaft acting against the collar 83 on said shaft to retract the stud shaft toward the dashboard. A series of spaced holes 84 in the dashboard, selectively receive the free end of the stud shaft and lock said shaft against undesired movement. The needle 13 on the handle hub moves over a scale with indicia 86 thereon indicating various vehicle speeds, and informs the driver of the selected speed corresponding to any locked position of the knob 12 and its stud shaft. Said needle is moved to any selected position by pulling the stud shaft by means of the knob 12 out of the hole 84 in which it may have been set, against the action of the spring 82 and rotating the handle 79 to set the needle to the desired new point on the scale. On release of the knob, the spring 82 retracts the stud shaft and permits it to enter that hole 84 which is in alignment therewith. The frame 56 and the parts carried thereby are thereby locked against displacement due to the weight thereof which might cause undesired rotation of the pinion 76. A spring 87 secured to the frame 56 and to the casing counterbalances the weight of the frame and the control unit carried thereby and renders vertical adjustment of the control unit relatively easy.

As has been indicated, the positions assumed by the frame 56 and the control unit carried thereby as shown in Fig. 1, are designed to produce a relatively high speed such as about 50 miles per hour, but the position of the throttle slide 22 is that equivalent to a fully retracted up position of the accelerator. This occurs after operation and release of the brake pedal 19 at any speed, thereby disconnecting temporarily, the control unit from the throttle slide by freeing the pin 32 from the hook 40. As best seen in Fig. 4, to accomplish the disconnection, the lever is swung about its pivot 38 by means of the trigger 21 pivoted to the casing as at 88, the upper end portion of the lever 37 being in the path of the lower end portion or non- corresponding end of the trigger. At its upper end, the triggers a pin 89 normally aligned with the armature of a solenoid 90, which is in the circuit of the normally open brake switch 20 as shown by the conductors 91, 92 (Fig. 1). Said switch is of any suitable type, but as shown, it comprises a movable contact member 93 pivoted as at 94 to a fixed bracket 95 and adapted to make contact with a fixed and preferably elongated contact member 96 also carried by the bracket 95 and suitably insulated therefrom. A pin 97 on the brake pedal rod engages the somewhat flexible projection 98 on the contact member 93 when the brake pedal is depressed thereby to move the member 93 into contact with the member 96 to close the circuit to the solenoid 90, said pin then snapping past the projection 98. On the return stroke of the brake pedal, the pin reengages the projection 98 and swings the member 93 to open the circuit aided by a suitable spring.

The trigger may be manually moved into the position of Fig. 4 through the knob 10 on the dashboard acting through the rod 100 projecting from said knob and connected to the trigger by the cable 101, which is supported by suitable pulleys as 102, 103 (Fig. 1). Said rod 100 is frictionally fitted into and can forcibly be made to slide in the bushing 104 on the dashboard, the rod remaining where set in said bushing. When the knob 10 is pulled out, the trigger is swung into the position of Fig. 4 and remains in that position until the knob is pushed in again to loosen the cable 101, whereupon the spring 105 becomes effective to return the trigger to the normal position thereof shown in Figs. 1 and 3. In case the control unit becomes defective or ceases to function properly, said unit is rendered inoperative by pulling out the knob 10 and thereby causing the lock lever 37 to release the pin 32 of the throttle slide 22. Thereafter, with the parts in the positions of Fig. 4, the accelerator is operated as though the control unit were absent.

When the control unit is in operation, the parts are in the positions shown in Fig. 3 with the pin 32 in the recess 41 of the hook 40. In this position, the control unit raises or lowers the throttle slide as more or less fuel is required to maintain the vehicle speed constant under different road, fuel and weather conditions. The mechanism, however, does not interfere with normal braking as for ordinary traffic hazards. Braking renders the control unit temporarily inoperative (Fig. 4) but the unit becomes again operative automatically when the accelerator is operated to attain or pass the selected vehicle speed and then released, such operation lifting the throttle slide to cause the pin 32 to move past the yielding hook 40 and to reenter the recess 41 when the lever is returned to its normal position by the spring 42. Thereafter, the driver need not operate the accelerator, since the control unit automatically raises the lock lever 37 through the lowered sleeve 62 which rotates the lever 65 to raise the control slide when more fuel is required to maintain the constant speed as when climbing hills, or in high winds, or on taking on additional loads. The control unit automatically lowers the lock lever at higher than the selected speed when less fuel is required. In that case, the weights 52 fly out and raise the sleeve 62 to rotate the lever 65 in the direction to lower the pin 70, slide 39, lever 37 and the throttle slide 22 as on down grades. For passing other vehicles, a speed greater than the selected speed is easily attained in a normal manner by depressing the accelerator to raise the throttle slide, thereby to raise the pin 32 off the hook without otherwise interfering with the operation of the control unit. Releasing the accelerator permits the throttle slide to drop back so that the pin 32 reengages the hook and the control unit again becomes operative.

It will now be seen that I have provided a relatively simple and efficient constant speed device readily attachable to old or new motor behicles, capable of functioning without interfering in any way with normal low speed operation of the vehicle as by braking, or high speed operation as by use of the accelerator, and therefore well designed to meet the severe requirements of practical use.

While certain specific embodiments of the invention have herein been shown and described, various obvious changes may be made therein without departing from the spirit of the invention defined by the appended claims.

I claim:

1. In speed control mechanism for motor vehicles, having an accelerator pedal and a spring-pressed throttle valve and a brake pedal, a control slide, a frame slidably supporting the slide, means responsive to the speed of the vehicle for moving the slide, said means being mounted on and adjustable relatively to the frame, a throttle slide slidably supported by the frame, means for operatively connecting the throttle slide to the throttle valve of the vehicle, a spring-pulled lever pivotally mounted on the control slide and swingable thereon and reciprocating therewith, cooperating interengageable and disengageable means on the lever and the throttle slide to lock the lever to the throttle slide and to move the throttle slide on movement of the control slide in one direction thereby to increase the opening of the throttle valve and to permit movement of the throttle slide on movement of the control slide in the opposite direction to decrease the opening of the throttle valve and means for swinging the lever.

2. In speed control mechanism for motor vehicles having an accelerator pedal and a spring-pressed throttle valve and a brake pedal, a control slide, means responsive to the speed of the vehicle for moving the slide, a throttle slide, means for operatively connecting the throttle slide to the throttle valve of the vehicle, a lock lever pivotally mounted on the control slide and swingable thereon and reciprocating therewith, cooperating interengageable and disengageable means on the lock lever and the throttle slide to lock the lever to the throttle slide and to move the throttle slide on movement of the control slide in one direction thereby to increase the opening of the throttle valve and to permit movement of the throttle slide on movement of the control slide in the opposite direction to decrease the opening of the throttle valve, and means for swinging the lever, said cooperating means comprising a hook on the lever and a pin on the throttle slide resting on the hook and removable therefrom on movement of the throttle slide by the accelerator pedal in said one direction relatively to the hook, said hook being disengaged from the pin independently of the accelerator pedal on pivotal movement of the lever by said lever-swinging means.

3. The speed control mechanism of claim 2, the means for swinging the lever to remove the hook from the pin comprising a pivoted trigger having an end part thereof adjacent the lever, and manually operated and electrically operated means for swinging the trigger against the lever, the electrically operated means including a normally open switch adapted to be closed on operation of the brake pedal and a solenoid energized by the closing of the switch and actuating the trigger.

4. In speed control mechanism for motor vehicles, a locking lever, control means responsive to the speed of the vehicle for moving said lever longitudinally, means for swinging said lever, a throttle slide movable to vary the fuel feed of the vehicle, and cooperating means on the lever and the slide to move the lever and slide as a unit in a direction to increase the fuel feed and to permit the slide to be separated from the lever on manipulation of the slide independently of the lever in said direction, said cooperating means being disengaged on the swinging of the lever by said swinging means to render the control means inoperative to move the slide.

5. The speed control mechanism of claim 4, the lever-swinging means comprising a trigger adjacent an end part of the lever, a brake-pedal-operated switch, and a solenoid operated by the closing of the switch and actuating the trigger.

6. The speed control mechanism of claim 4, the lever-swinging means comprising a trigger adjacent the lever, and means for manually actuating the trigger.

7. The speed control mechanism of claim 4, a movable frame carrying the control means and the lever, and means for adjusting the position of the frame relatively to the slide to select the vehicle speed.

8. The speed control mechanism of claim 7, the control means comprising a governor, a second lever actuated by the governor, and a second slide actuated by the second lever and pivotally supporting the first mentioned lever.

9. The speed control mechanism of claim 7, the frame-adjusting means comprising a rack on the frame, a pinion engaging the rack, a flexible operating shaft for the pinion, and speed-indicator means for rotating the shaft.

10. In speed control mechanism for motor vehicles provided with a speedometer and a speedometer cable, a frame, speed control means responsive to the speed of the vehicle and carried by the frame and comprising a governor, means operated by the cable for rotating the governor, a control slide, a throttle slide mounted independently of the control slide and for movement substantially parallel to the movement of the control slide, means for adjusting the position of the frame and control means relatively to the throttle slide to select the vehicle speed, and disengageable cooperating elements on the throttle slide and the control slide for connecting and disconnecting the throttle slide from the control means on the manipulation of the throttle slide.

11. The speed control mechanism of claim 10, and means independent of the slides for disconnecting the cooperating elements to render the control means inoperative.

12. The speed control mechanism of claim 11, one of the cooperating elements being a spring-pulled lever and a pivot for the lever on the control slide, and the disconnecting means including a trigger adapted to engage and to swing the lever.

13. The speed control mechanism of claim 11, the control means including a lever swingably mounted on the control slide, and the means for disconnecting the elements comprising a trigger adapted to engage and to swing the lever and means responsive to operation of the brake pedal of the vehicle to actuate the trigger.

14. The speed control mechanism of claim 11, the control means including a lever swingably mounted on the control slide and the cooperating elements comprising a projection on the lever and an element on the slide arranged to engage the projection when the control means is operative and to be released by the projection when the 15. In speed control mechanism for motor vehicles, a lever having a hook thereon, a control slide carrying the lever, slide-control means responsive to the vehicle speed for moving the slide and the lever as a unit, a frame supporting the slide-control means, the slide and the lever, a throttle slide having a pin thereon normally in the path of the hook, a trigger to swing the lever and thereby to carry the hook away from the pin, means for adjusting the frame relatively to the throttle slide to select the vehicle speed, and means for operating the trigger to render the hook inoperative to move the throttle slide.

16. The speed control mechanism of claim 15, a speed indicator, and means cooperating with the indicator to operate the frame-adjusting means.

17. The speed control mechanism of claim 15, the means for operating the trigger comprising a brake-switch and a trigger-operating solenoid energized on the closing of the switch.

18. The speed control mechanism of claim 17 and manually operated means including a cable for moving the trigger into position to swing the lever when the cable is tensioned and for thereafter maintaining the trigger in said position until the cable is manually released.

19. In speed control mechanism for motor vehicles having a throttle valve, a speedometer cable, and a spring-pressed accelerator controlling the opening of the valve, a movable control member, a yieldable connection between the member, the valve and the accelerator, a speed control unit responsive to the vehicle speed, means for driving the unit comprising a frame for the unit, a gear rotatably supported by the frame, an elongated pinion beyond the frame and engaging the gear and rotated by the speedometer cable, means for bodily adjusting the position of the unit relatively to the member while maintaining the engagement of the gear and pinion, thereby to select the vehicle speed, and disconnectable means connecting the unit and the member whereby the member and the valve are operable simultaneously by the driver operation of the accelerator independently of the unit to increase the vehicle speed above the selected speed, and the member is connected to and operated by the unit to control the valve opening automatically when the accelerator is released by the driver.

References Cited in the file of this patent
UNITED STATES PATENTS

| | | |
|---|---|---|
| 2,014,854 | Lothrop | Sept. 17, 1935 |
| 2,226,425 | Epperson | Dec. 24, 1940 |
| 2,283,478 | Warren | May 19, 1942 |
| 2,302,085 | Wolfe et al. | Nov. 17, 1942 |
| 2,450,113 | Burchett | Sept. 28, 1948 |